United States Patent
Okamura et al.

(10) Patent No.: US 8,690,654 B2
(45) Date of Patent: Apr. 8, 2014

(54) GAME SYSTEM, GAME CONTROL METHOD, GAME DEVICE, AND COMPUTER-READABLE STORAGE MEDIUM

(71) Applicant: Nintendo Co., Ltd., Kyoto (JP)

(72) Inventors: Yuichiro Okamura, Kyoto (JP); Yoshikazu Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/713,691

(22) Filed: Dec. 13, 2012

(65) Prior Publication Data

US 2013/0324200 A1    Dec. 5, 2013

(30) Foreign Application Priority Data

Jun. 1, 2012   (JP) ................................. 2012-126124

(51) Int. Cl.
    *A63F 9/24*    (2006.01)
(52) U.S. Cl.
    USPC ............................................................ 463/1

(58) Field of Classification Search
    USPC ............................................................ 463/1
    See application file for complete search history.

(56) References Cited

U.S. PATENT DOCUMENTS

| 8,287,350 B2* | 10/2012 | Konishi et al. ................. 463/16 |
| 2012/0302338 A1* | 11/2012 | Shikata et al. .................. 463/31 |
| 2013/0244740 A1* | 9/2013 | Shimamura et al. ............ 463/2 |
| 2013/0260881 A1* | 10/2013 | Nonaka et al. ................. 463/29 |
| 2013/0324265 A1* | 12/2013 | Takagi et al. .................. 463/43 |

FOREIGN PATENT DOCUMENTS

JP   2011-143172   7/2011

* cited by examiner

*Primary Examiner* — Pierre E Elisca
(74) *Attorney, Agent, or Firm* — Nixon & Vanderhye, P.C.

(57) ABSTRACT

To run a game in which a life object indicating the value of a life parameter shared by player characters is displayed on a display unit and the life parameter is reduced for an amount equivalent to a damage from which a player character suffers, when at least one of the player character is attacked within an attack invalidation period that starts when one of the player characters is attacked, the life parameter is reduced only for an amount equivalent to the damage that triggers the start of the attack invalidation period.

10 Claims, 5 Drawing Sheets

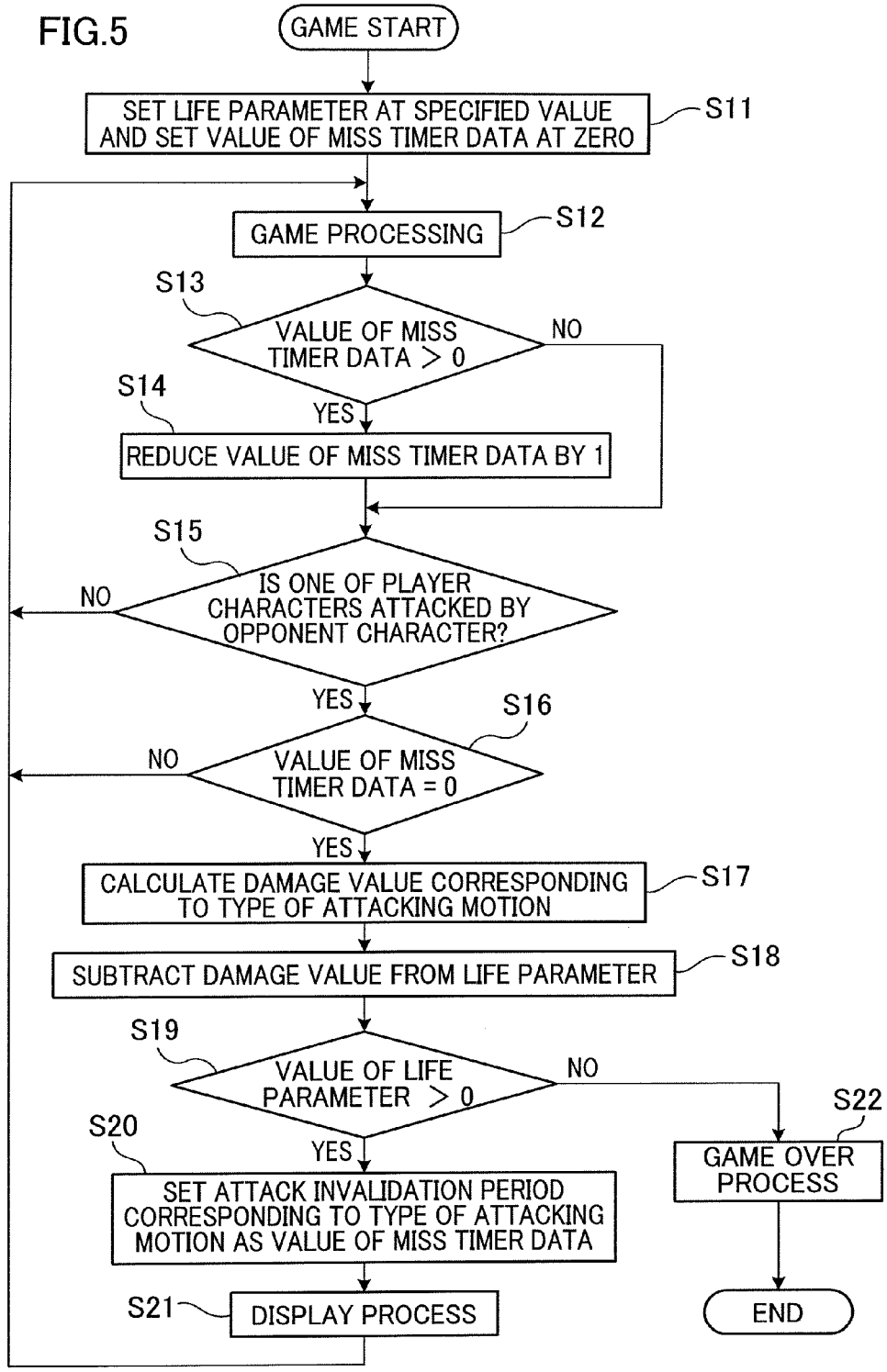

GAME SYSTEM, GAME CONTROL METHOD, GAME DEVICE, AND COMPUTER-READABLE STORAGE MEDIUM

CROSS REFERENCE TO RELATED APPLICATION

The present application claims priority from Japanese Patent Application No. 2012-126124, which was filed on Jun. 1, 2012, the disclosure of which is herein incorporated by reference in its entirety.

FIELD

The technology herein relates to a game system, a game control method, a game device, and a computer-readable storage medium, for controlling a character moving in accordance with player's operations in a virtual space displayed on a display or the like.

BACKGROUND AND SUMMARY

In known games, a character that moves in accordance with player's operations fights against an opponent character in a virtual space displayed on a display or the like.

In some of such games, a parameter of the stamina of the character moving in accordance with player's operations is displayed on the display, and the parameter is reduced each time the character is hit by the attack or the like of the opponent character and the game ends when the parameter reaches zero.

Furthermore, in some of the games above, a plurality of players join a single game and the characters of the players cooperate with one another to fight against an opponent character.

In such a multi-player game, how the parameter indicating the stamina of each character is displayed and in what cases the parameter is reduced would be a factor of determining the behavioral principle of the characters in the virtual space.

An object of the technology is to provide a game system, a game control method, a game device, and a game program, in which a parameter indicating the stamina of a character is designed to facilitate more players to participate in a game.

To achieve the object above, the technology includes the following features.

According to an aspect of the technology, a game system in which characters are displayed on a display includes: a life parameter storage unit configured to be shared by the characters and to store a life parameter related to a game end condition; a life display unit configured to display a life object indicating the life parameter on the display; a determination unit configured to determine whether at least one of the characters is damaged based on game processing; a life parameter reduction unit configured to reduce the life parameter in accordance with a damage when the determination unit determines that at least one of the characters is damaged; and a life parameter reduction amount controller configured to control the life parameter reduction unit in such a way that, when one of the characters suffers from a first damage and then at least one of the characters suffers from a second damage within a predetermined period starting from the first damage, the life parameter reduction unit reduces the life parameter only for an amount equivalent to the first damage.

According to the above, in a game in which a life object indicating a life parameter shared by a plurality of characters is displayed and the life parameter is reduced for an amount equivalent to a damage on a character, when at least one of the characters suffers from a second damage within a predetermined period that starts when one of the characters suffers from a first damage, the life parameter is reduced only for an amount equivalent to the first damage. With this, within the predetermined period starting from the first damage on one of the characters, the life parameter is not reduced even if at least one of the characters suffers from the second damage.

Furthermore, the predetermined period may be set in accordance with the type of the damage from which at least one of the characters suffers.

According to the above, it is possible to set the predetermined period in accordance with the type of a damage from which a character suffers. With this, for example, game balance is maintained in such a way that the predetermined period is arranged to be short when at least one of the player characters suffers from a damage with which the degree of reduction in the life parameter is small, whereas the predetermined period is arranged to be long when at least one of the player characters suffers from a damage with which the degree of reduction in the life parameter is large. It is noted that the type of a damage includes a damage value, the type of an attacking motion, or the like.

In addition to the above, the game system may be arranged so that, opponent characters capable of causing the damage are displayed on the display, and the life parameter reduction amount controller controls the life parameter reduction unit in such a way that, when one of the characters suffers from the first damage made by one of the opponent characters and then at least one of the characters suffers from the second damage made by the one of the opponent characters within the predetermined period starting from the first damage, the life parameter reduction unit reduces the life parameter only for an amount equivalent to the first damage.

According to the above, in a game in which opponent characters capable of causing the damage are displayed, when one of characters suffers from a first damage made by an opponent character and then at least one of the characters suffers from a second damage made by the same opponent character within a predetermined period starting from the first damage, a life parameter is reduced only for an amount equivalent to the first damage. With this, within the predetermined period after the first damage on one of characters made by one opponent character, the life parameter is not reduced even if at least one of the characters suffers from the second damage made by the same opponent character. On the other hand, even in the predetermined period after the first damage on one of characters made by one opponent character, the life parameter is reduced when at least one of the characters is damaged by another opponent character. As such, by setting the predetermined period in which the life parameter shared by the characters is not reduced for each of the opponent characters, the independence of each of the opponent characters is attained in the game.

In addition to the above, the game system may be arranged so that the characters are controlled by an input made by corresponding players.

According to the above, it is possible to run a game that uses a life parameter shared by characters that are controlled based on inputs from players.

The technology disclosed above may be embodied not only as a game system but also as a game control method, a game device, or a game program.

The technology makes it possible to provide a game system, a game control method, a game device, and a game program, in which a parameter indicating the stamina of a character is designed to facilitate more players to participate in a game.

BRIEF DESCRIPTION OF THE DRAWINGS

FIG. 5 shows an example non-limiting flowchart of processing of a game program of the present embodiment.

DETAILED DESCRIPTION OF NON-LIMITING EXAMPLE EMBODIMENTS

Embodiment

A game system 1 of an embodiment will be described with reference to figures.

(Structure of Game System 1)

Figure 1:
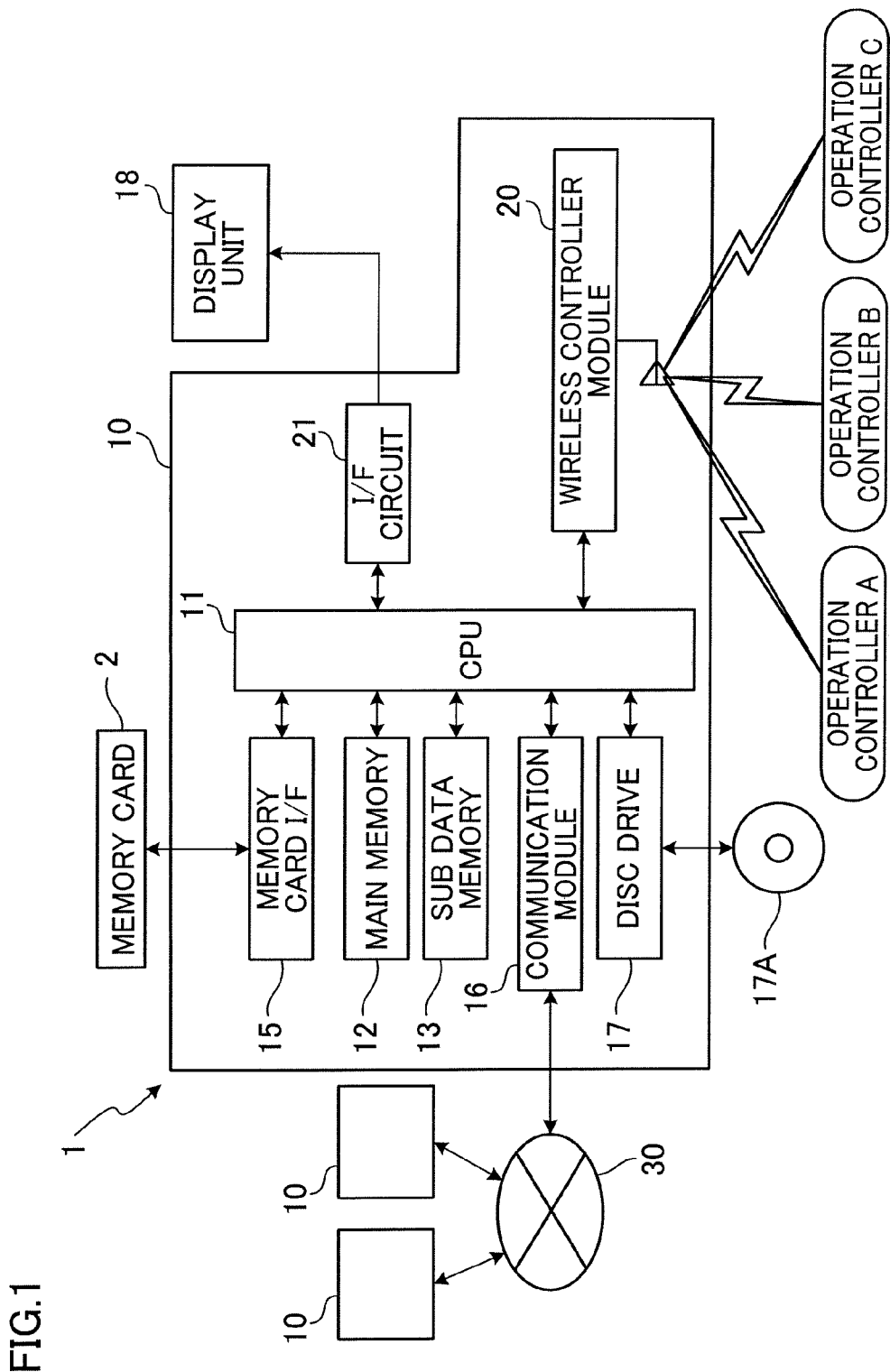
FIG. 1 shows an example non-limiting block diagram of a game system and a game device of an embodiment.

As shown in the block diagram of FIG. 1, the game system 1 of the present embodiment includes a game device 10, a display unit 18, and operation controllers A to C, and is arranged to allow a plurality of players to play a game off line. Furthermore, the game device 10 is arranged to be connectable to other game devices 10 over a network 30 such as the Internet, to allow a plurality of players to play a game on line.

The display unit 18 is, for example, a liquid crystal display unit having a liquid crystal display. In the present embodiment, the display unit 18 displays a game image which is generated by virtually filming a virtual space 50.

The operation controllers A to C are input devices by which an input for operating a character displayed on the display unit 18 is transmitted to the game device 10. More specifically, each of the operation controllers A to C includes one or plural operation component for receiving an input from a player. For example, each of the operation controllers A to C includes a cross button, a start button, a select button, a confirm button, and a cancel button, and further includes a touch panel which outputs signals based on a touch operation by the player.

The operation controllers A to C are connected to the game device 10 (wireless controller module 20) by wireless communication. It is noted that the number of the operation controllers may be suitably increased or decreased, and the operation controllers A to C may be connected to the game device 10 by wire.

(Structure of Game Device 10)

Now, the structure of each of the game devices 10 constituting the game system 1 will be described with reference to FIG. 1.

The game device 10 includes components such as a CPU 11, a main memory 12, a sub data memory 13, a memory card interface (memory card I/F) 15, a communication module 16, a disc drive 17, a wireless controller module 20, and an interface circuit (I/F circuit) 21.

To the CPU 11 are connected, via unillustrated buses, the main memory 12, the sub data memory 13, the memory card I/F 15, the communication module 16, the disc drive 17, the wireless controller module 20, the I/F circuit 21, or the like.

The CPU 11 executes predetermined processing by running a predetermined program. For example, the CPU 11 runs a later-described game program 31. The main memory 12 functions as a work area of the CPU 11. That is to say, the main memory 12 stores a predetermined program and information data that the CPU 11 obtains from the outside via the memory card I/F 15, the communication module 16, the disc drive 17, or the like, different types of data obtained in the predetermined processing, or the like.

The sub data memory 13 is a rewritable non-volatile memory. This sub data memory 13 is provided to store a program for booting the game device 10, predetermined parameters, or the like.

To the memory card I/F 15, a memory card 2 is detachably connected. Under the control of the CPU 11, the memory card I/F 15 writes data into the memory card 2 or reads data from the memory card 2.

Into the disc drive 17, an optical disc 17A is removably inserted. Furthermore, the disc drive 17 is capable of reading program data or the like from the optical disc 17A and writing data having been retrieved to the main memory 12 into the optical disc 17A.

The communication module 16 is capable of communicating with another game device 10 over the network 30 by means of, for example, a method in compliance with a communication standard.

The I/F circuit 21 is connected to a display unit 18. The I/F circuit 21 includes an image control circuit and outputs, to the display unit 18, image data generated based on an instruction from the CPU 11.

The wireless controller module 20 connects the operation controllers A to C with the game device 10 by wireless communication by causing the game device 10 by receiving operation data transmitted from each of the operation controllers A to C by wireless and by sending data to each of the operation controllers A to C.

(Outline of Game Processing Executed in Three-Dimensional Virtual Space)

Figure 3:
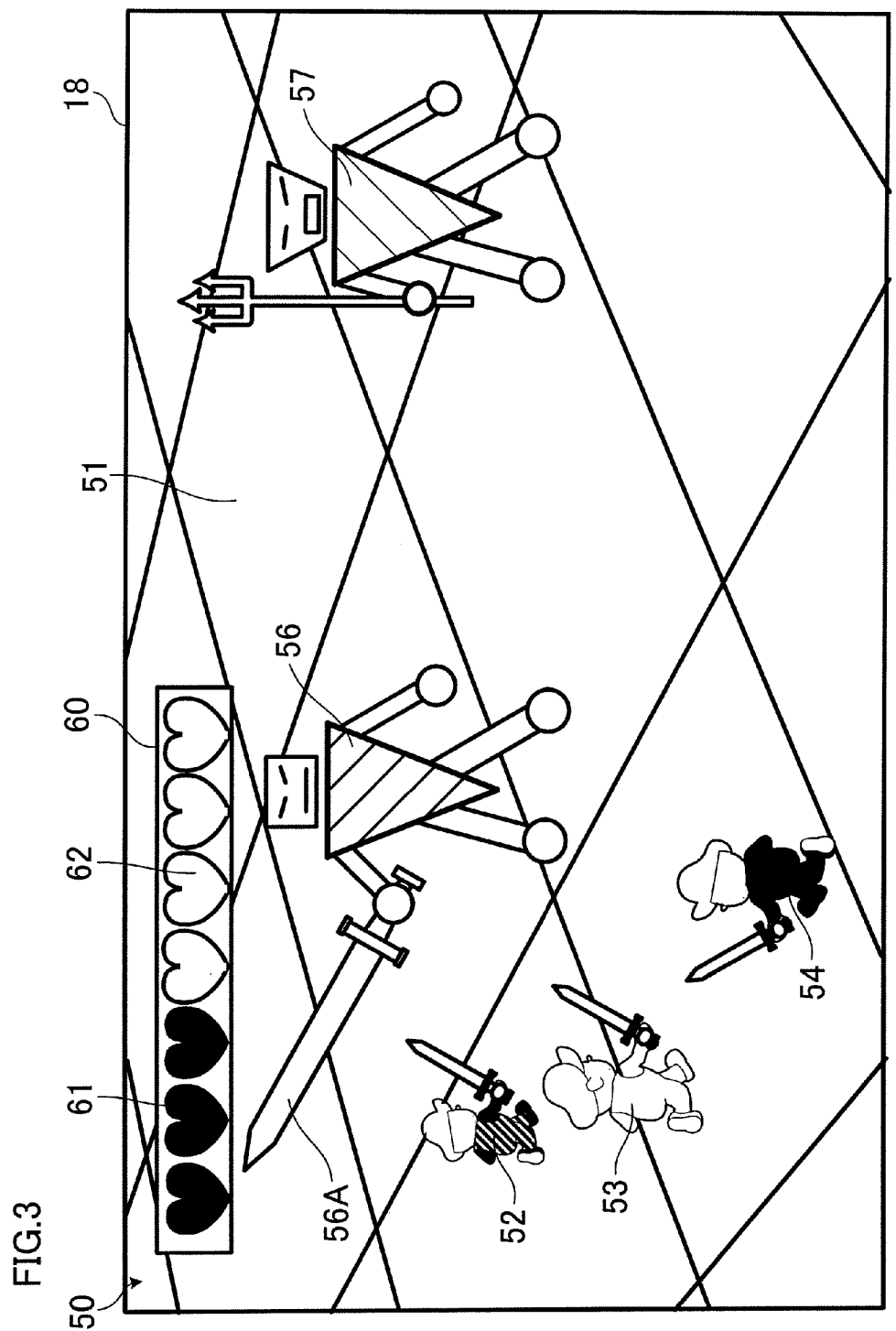
FIG. 3 shows an example non-limiting first explanation drawing of a game image displayed on a display unit.
Figure 4:
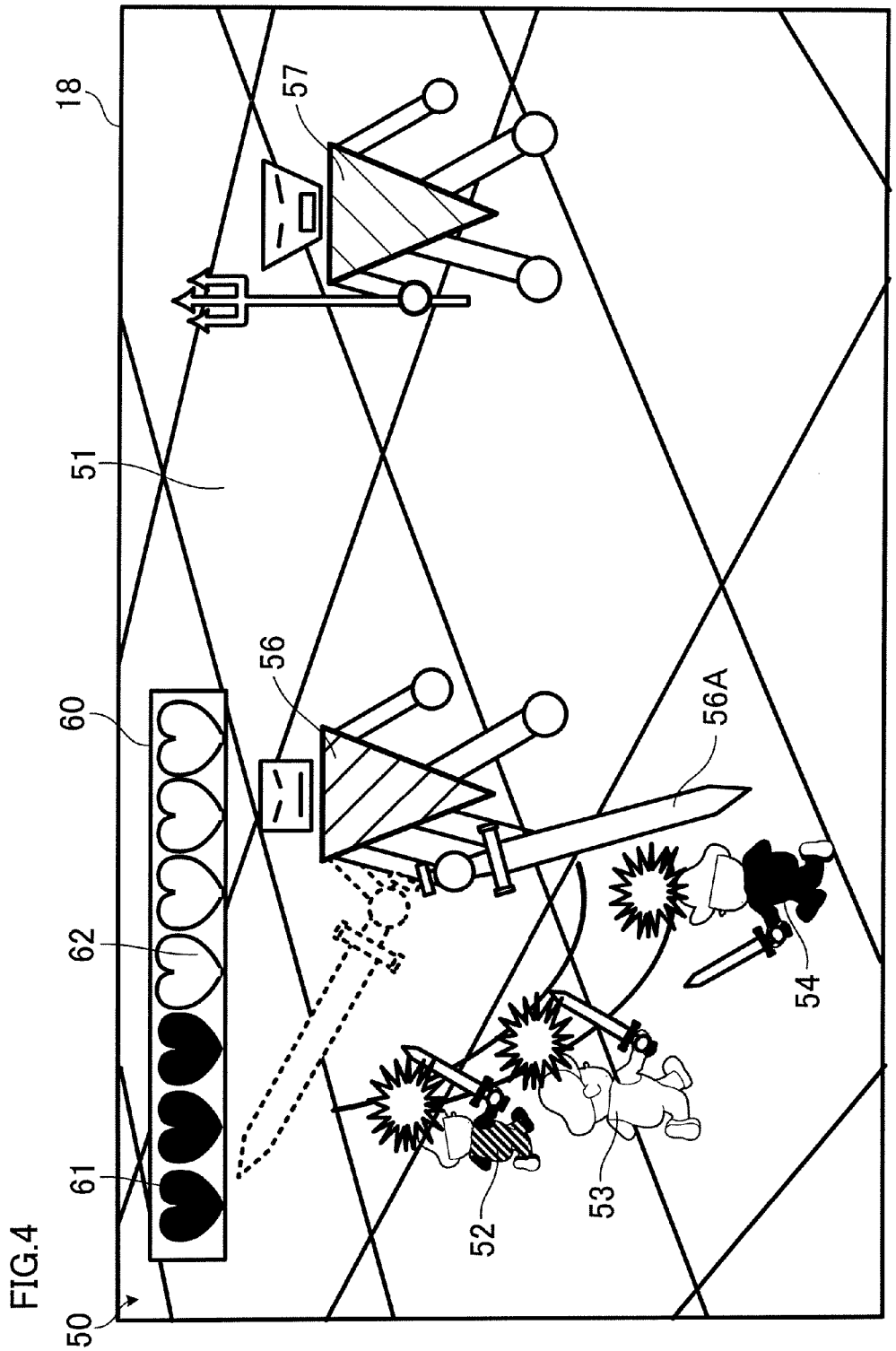
FIG. 4 shows an example non-limiting second explanation drawing of a game image displayed on the display unit.

With reference to FIG. 3 and FIG. 4, the following will describe an outline of a game which is run by the game device 10 based on a game program (i.e., an outline of game processing).

In the game processing executed by the game device 10, as shown in FIG. 3, on a field 51 provided in a three-dimensional virtual space 50 displayed on the display screen of the display unit 18, a plurality of player characters 52, 53, and 54 and opponent characters 56 and 57 are provided. The player character 52 is associated with the operation controller A, the player character 53 is associated with the operation controller B, and the player character 54 is associated with the operation controller C. The opponent characters 56 and 57 are automatically controlled by a program. By using an operation controller A, B, or C, each player inputs instructions to move the player character 52, 53, or 54 in the field 51 in the virtual space 50, to attack the opponent character 56 or 57, or to defend the character from the attack of the opponent character 56 or 57. Each player proceeds the game in this way. In the present embodiment, the game is proceeded in such a manner that the player characters 52, 53, and 54 operated by three players by using the operation controllers A to C cooperate one another in the three-dimensional virtual space 50 and try to achieve a predetermined object such as defeating the opponent characters 56 and 57.

At an upper left part of the display screen of the display unit 18, a life object 60 is displayed to indicate a life parameter 41 indicating the stamina shared by the player characters 52, 53, and 54. In the present embodiment, the life object 60 is represented as seven heart-shaped black objects 61 as shown in FIG. 3. The reduction in the life parameter 41 is represented such that, each time a player character is hit by an attack or the like of the opponent character 56 or 57, at least a part of a heart-shaped black object 61 of the life object 60 changes to a white object 62. The game ends when the life parameter 41 is reduced and the life object 60 has only white objects 62 (i.e., when the life parameter 41 becomes zero).

In addition to the above, in the present embodiment, the life object 60 is shared by the three player characters 52, 53, and 54. The life parameter 41 is therefore reduced when at least one of the player characters 52, 53, and 54 is hit by an attack or the like of the opponent character 56 or 57. Furthermore, when the number of remaining black objects 61 in the life object 60 becomes two, the entirety of the life object 60 including the objects 61 and 62 flickers to notify the players that the number of remaining life object 60 is small.

As detailed later, in the present embodiment, as shown in FIG. 4, when the opponent character 56 launches an attack by using a sword 56A and the player character 52, the player character 53, and the player character 54 are serially attacked in this order by the sword 56A in a short time, the number of the remaining heart-shaped objects 61 of the life object 60 is reduced only for the player character 52 who is attacked first. As to the attacks on the player characters 53 and 54, no damage is calculated and the number of the remaining heart-shaped objects 61 of the life object 60 is not reduced for these attacks. It is noted that these characters for which no damages are calculated may be depicted as being as if they are damaged, for the sake of a visual effect. For example, all of the player characters 52, 53, and 54 may be blown away.

(Memory Map of Main Memory 12)

Figure 2:
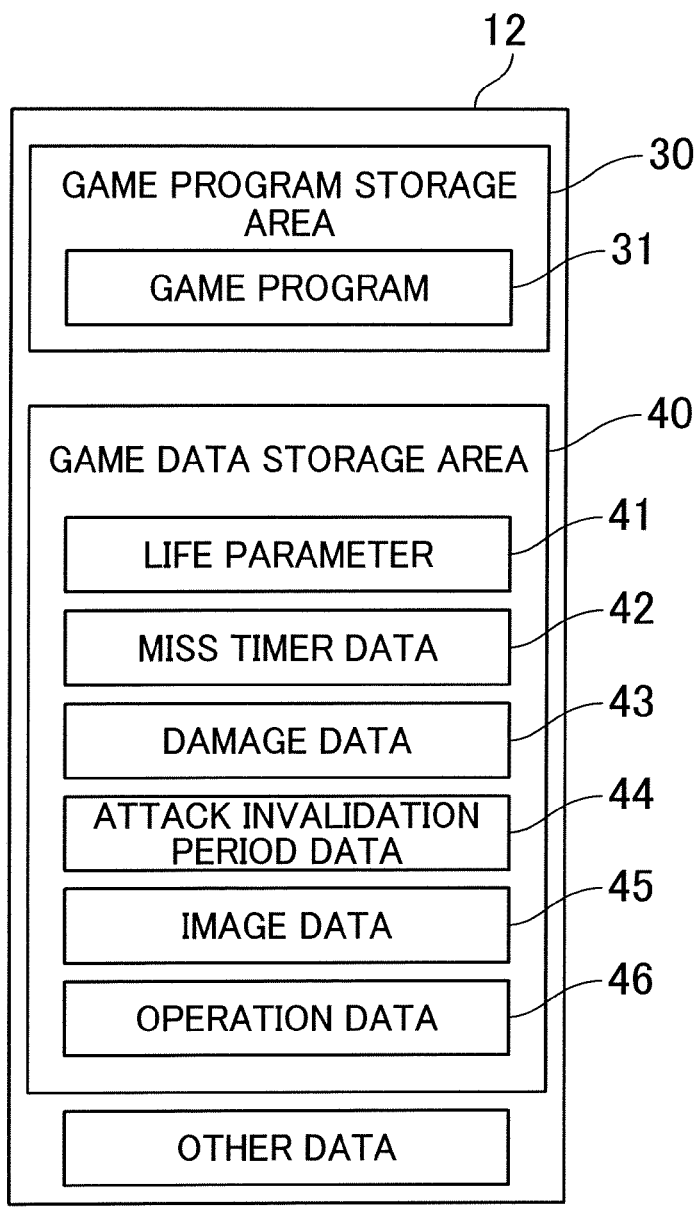
FIG. 2 shows an example non-limiting memory map of a main memory of the present embodiment.

Now, programs and data stored in the main memory 12 will be described. As shown in FIG. 2, the main memory 12 has a game program storage area 30 and a game data storage area 40.

The game program storage area 30 includes a game program 31 or the like. The game program 31 is a program for causing the CPU 11 to execute later-described game processing. The game program 31 is obtained from an external medium (a memory card 2, an external server, an optical disc 17A, or the like) via the memory card I/F 15, the communication module 16, the disc drive 17, or the like. This program is stored in the main memory 12.

On the other hand, the game data storage area 40 stores a life parameter 41, miss timer data 42, damage data 43, attack invalidation period data 44, image data 45, operation data 46, or the like.

The life parameter 41 is, as described above, numerical data indicating the stamina shared by the player characters 52, 53, and 54. This life parameter 41 is displayed as a heart-shaped black object 61 in the life object 60.

The miss timer data 42 is numerical data functioning as a counter which is set when a predetermined condition is satisfied in the game processing.

The damage data 43 is numerical data indicating the degree of damage on the player character 52, 53, or 54 resulting from an attack of the opponent character 56 or 57, which degree is associated with the type of attacking motion. A plurality of types of the damage data 43 are stored in association with the respective types of the attacking motions of the opponent characters 56 and 57. In the present embodiment, a plurality of types of numerical data are calculated for different types of attacking motions of the opponent characters 56 and 57.

The attack invalidation period data 44 indicates a predetermined attack invalidation period which starts when a predetermined condition is satisfied. An example of the predetermined condition is such that at least one of the player characters 52, 53, and 54 is attacked by at least one of the opponent characters 56 and 57. A plurality of types of the attack invalidation period data 44 are stored in association with the types of the attacking motions of the opponent characters 56 and 57. In the present embodiment, the attack invalidation period differs according to the attacking motion of the opponent character 56 or 57, which motion plays a role in the satisfaction of the predetermined condition. In the present embodiment, the types of the attacking motions are equivalent to the types of the damage on a character.

In addition to the above, the main memory 12 stores data such as the image data 45 generated for being displayed on the display screen of the display unit 18 and the operation data 46 indicating an input made to each of the operation controllers A to C.

Furthermore, the main memory 12 stores data for displaying game images in a game, such as data of different types of game background images, polygon models, and textures.

(Processing)

Now, referring to the flowchart of FIG. 5, processing executed by the game device 10 (CPU 11) will be described. This processing is executed as the CPU 11 runs a game program 31.

When a player instructs to start a game, the game program 31 causes the CPU 11 to execute the steps below. To begin with, the CPU 11 sets the life parameter 41 at a specified value and sets the miss timer data 42 at zero (S11). To put it differently, the life parameter 41 and the value of the miss timer data 42 in the main memory 12 are updated.

Then the game processing is executed (S12). The game processing includes a process to generate a game image for one frame to be displayed on the display screen of the display unit 18 and a process for controlling the progress of the game. The game processing is executed every 1/60 second. In the game processing, based on the operation data 46 from each of the operation controllers A to C, the position, direction, motion, or the like of each of the player characters 52, 53, and 54 are controlled and the position, direction, motion, or the like of each of the opponent characters 56 and 57 are also controlled. Furthermore, a game image generated based on the result of the processing is displayed on the display unit 18. It is noted that, the miss timer data 42 is counted by one when time equivalent to one frame elapses.

Subsequently, whether the value of the miss timer data 42 is larger than zero is determined (S13). When the value of the miss timer data 42 is larger than zero (S13: YES), the value of the miss timer data 42 is counted down by one (S14). To put it differently, the value of the miss timer data 42 of the main memory 12 is updated.

After the step S14 or when the value of the miss timer data 42 is not larger than zero in the step S13 (S13: NO), whether at least one of the player characters 52, 53, and 54 has been attacked by at least one of the opponent characters 56 and 57 is determined (S15). When none of the player characters 52, 53, and 54 has been attacked by the at least one of the opponent characters 56 and 57 (S15: NO), the processing proceeds to the step S12.

On the other hand, when at least one of the player characters 52, 53, and 54 has been attacked by at least one of the opponent characters 56 and 57 (S15: YES), whether the value of the miss timer data 42 is zero is determined (S16). When the value of the miss timer data is not zero (S16: NO), the processing proceeds to the step S12.

On the other hand, when the value of the miss timer data 42 is zero (S16: YES), a damage value associated with the type of the attacking motion of the attack of at least one of the opponent characters 56 and 57 is calculated with reference to the damage data 43 (S17). For example, when the attack of the opponent character 56 is bare-knuckle punch (one type of the attacking motion), the calculated damage value is "0.5" which is associated with the bare-knuckle punch and is equivalent to the half of a heart-shaped object 61. In the meanwhile, when the attack of the opponent character 56 is made by the sword 56A (one type of the attacking motion), the calculated damage value is "1.0" which is associated with the attack by the sword 56A and is equivalent to the entirety of a heart-shaped object 61.

Then the damage value calculated in the step S17 is subtracted from the life parameter 41 (S18). In this way, the life parameter 41 is updated. In so doing, the value of the life parameter 41 after the subtraction is displayed at the upper left part of the display screen of the display unit 18, as the remaining number of heart-shaped black objects 61 in the life object 60.

Thereafter, whether the life parameter 41 is larger than zero is determined (S19). When the life parameter 41 is larger than zero (S19: YES), the attack invalidation period associated with the type of the attacking motion of the attack of the at least one of the opponent characters 56 and 57 is set as the value of the miss timer data 42, with reference to the attack invalidation period data 44 (S20). For example, when the attack of the opponent character 56 is bare-knuckle punch (one type of the attacking motion), the attack invalidation period "60" associated with the punch is set as the value of the miss timer data 42. In the meanwhile, when the attack of the opponent character 56 is made by the sword 56A (one type of the attacking motion), the attack invalidation period "90" associated with the attack by the sword 56A is set as the value of the miss timer data 42.

Based on the results of the steps S17 to S20, a game image is generated and displayed on the display unit 18 (S21). Thereafter, the processing proceeds to the step S12.

On the other hand, when the life parameter 41 is not larger than zero (S19: NO), a game over process is executed (S22). In this game over process, all of the player characters 52, 53, and 54 become disabled and an effect notifying the end of the game processing is carried out. In this way, the processing above is ended for the time being.

Now, how the game progresses as the processing above is executed will be described with a specific example. Assume that, as shown in FIG. 3, after the game starts and a predetermined time elapses, the remaining number of the heart-shaped objects 61 in the life object 60 shared by the player characters 52, 53, and 54 is three, and the value of the miss timer data is zero.

Under the conditions stated above, as shown in FIG. 4, further assume that, on account of the attack of the opponent character 56 with the attacking motion made by the sword 56A, the player character 52, the player character 53, and the player character 54 are attacked in this order by the sword 56A within a short time (i.e., the characters are serially attacked at intervals of one frame period).

According to a conventional processing, each of the player character 52, the player character 53, and the player character 54 suffers from a damage "1.0" associated with the attack by the sword 56A resulting from the attacking motion made by the sword 56A, which is equivalent to one heart-shaped object 61. Therefore, the total damage is "3.0" which is equivalent to three heart-shaped objects 61, and hence the game is immediately over.

As such, according to the conventional processing, a single attack of the opponent character 56 may cause fatal damage to the player characters. In the case above, the game becomes over without the flickering of the life object 60, which is carried out to notify to the players that the remaining value of the life parameter 41 is small, when the remaining objects 61 in the life object 60 becomes two. Some players feel uneasy with such sudden game over.

In this regard, as the processing according to the present embodiment is executed, the game progresses in the following steps. First of all, it is determined in the step S15 that the player character 52 has been attacked by the opponent character 56 (S15: YES), and it is determined in the step S16 that the value of the miss timer data 42 is zero (S16: YES). Thereafter, in the step S17, the remaining number of the heart-shaped objects 61 in the life object 60 becomes two for the reason that a damage "1.0" equivalent to one heart-shaped object 61 is done by the attack by the sword 56A of the opponent character 56. At this stage, the life object 60 flickers to notify the players that the remaining value of the life parameter 41 is small.

Because the remaining number of the heart-shaped objects 61 is two, it is determined that the life parameter 41 is larger than zero (S19: YES), and the attack invalidation period "90" associated with the attack by the sword 56A (one type of the attacking motion) is set as the value of the miss timer data 42. Thereafter, back to the step S12, the value of the miss timer data is reduced through the steps S12 to S14 or the like.

Then it is determined in the step S15 that the player character 53 has been attacked by the opponent character 56 (S15: YES). In this regard, as the value of the miss timer data 42 indicates "89", it is determined in the step S16 that the value of the miss timer data 42 is not zero (S16: NO). As such, even if attacked by the opponent character 56 by the sword 56A, no damage value is calculated and the reduction in the number of the remaining the heart-shaped objects 61 in the life object does not occur for the player character 53. Furthermore, no damage value is calculated even if attacked by the opponent character 57.

It is also determined in the step S15 that the player character 54 has been attacked by the opponent character 56 (S15: YES). In this regard, because the value of the miss timer data 42 indicates "88", it is determined in the step S16 that the value of the miss timer data 42 is not zero (S16: NO). As such, even if attacked by the opponent character 56 by the sword 56A, no damage value is calculated and the reduction in the number of the remaining the heart-shaped objects 61 in the life object 60 does not occur for the player character 54, either.

As the steps above are executed, even if the player character 52, the player character 53, and the player character 54 are attacked in this order within a short time by the opponent character 56 by using the sword 56A, the damage is calculated and the remaining number of the heart-shaped objects 61 in the life object 60 is reduced only for the player character 52 which is attacked first, while no damage value is calculated and the reduction in the number of the remaining the heart-shaped objects 61 in the life object 60 does not occur for the attacks on the player characters 53 and 54. It is therefore possible to prevent a single attack by the opponent character 54 from causing fatal damage to the characters, and the dissatisfaction of the players with sudden game over is resolved.

According to the arrangement above, in a game in which the life object 60 indicating the life parameter 41 shared by the player characters 52, 53, and 54 is displayed on the display unit 18 and the life parameter 41 is reduced for the amount of the damage on the player characters 52, 53, and 54, when at least one of the player characters 52, 53, and 54 is damaged within the attack invalidation period (predetermined period) that starts when one of the player characters 52, 53, and 54 is damaged, the life parameter 41 is reduced only for the amount of the first damage that triggers the start of the attack invalidation period. According to this arrangement, within the attack invalidation period that starts when one of the player characters 52, 53, and 54 is damaged, the life parameter 41 is not reduced even if at least one of the player characters 52, 53, and 54 is damaged.

Furthermore, according to the arrangement above, the attack invalidation period (predetermined period) may be set in accordance with each type of the attacking motion (the type of the damage) of the attack at which at least one of the player characters 52, 53, and 54 is hit. For example, when the attack is bare-knuckle punch (one type of the attacking motion) of the opponent character 56, the attack invalidation period "60" associated with the punch is set as the value of the miss timer data 42. In the meanwhile, when the attack is made by the opponent character 56 by using the sword 56A (one type of the attacking motion), the attack invalidation period "90" associated with the attack by the sword 56A is set as the value of the miss timer data 42. The game balance is maintained in this manner.

Furthermore, according to the arrangement above, a plurality of players are able to enjoy a game in which the life parameter 41 is shared by the player characters 52, 53, and 54, by making inputs to the operation controllers A to C.

Other Embodiments and Modifications

While in the embodiment above the value of the miss timer data 42 is set in the steps S15 and S20 without distinguishing the opponent character 56 from the opponent character 57, the opponent character 56 may be distinguished from the opponent character 57. Furthermore, the values of the miss timer data 42 may be set for the respective opponent characters 56 and 57. In other words, the value of the miss timer data 42 may be set for each opponent character. In such a case, when, for example, the player character 52 shown in FIG. 3 is attacked by the opponent character 56 by using the sword 56A and the value of the miss timer data 42 associated with the opponent character 56 is set at "90", the player character 53 receives no damage and the number of the heart-shaped objects 61 in the life object 60 is not reduced when the player character 53 is attacked by the opponent character 56 within the period of "90". However, if the player character 53 is attacked by the opponent character 57, the player character 53 is damaged and the number of the heart-shaped objects 61 in the life object 60 is reduced, because the value of the miss timer data 42 corresponding to the opponent character 57 is zero.

According to this arrangement, in a game in which a plurality of opponent characters 56 and 57 capable of causing damage are displayed, when one of the player characters 52, 53, and 54 is attacked by the opponent character 56 and then any one of the player characters 52, 53, and 54 is attacked by the same opponent character 56 within the attack invalidation period, the life parameter is reduced only for the amount of the first damage caused by the opponent character 56, which damage triggers the start of the attack invalidation period. With this, within the attack invalidation period that starts when one of the player characters 52, 53, and 54 is attacked by the opponent character 56, the life parameter 41 is not reduced even if at least one of the player characters 52, 53, and 54 is attacked by the opponent character 56. On the other hand, even within the attack invalidation period starting when one of the player characters 52, 53, and 54 is attacked by the opponent character 56, the life parameter 41 is reduced when at least one of the player characters 52, 53, and 54 is attacked by the other opponent character 57. As such, by setting the attack invalidation period in which the life parameter 41 shared by the player characters 52, 53, and 54 is not reduced for each of the opponent characters 56 and 57, the independence of each of the opponent characters 56 and 57 is attained in the game.

In addition to the above, the embodiment above is arranged so that, in the step S20, with reference to the attack invalidation period data 44, an attack invalidation period associated with one type of the attacking motion of the at least one of the opponent characters 56 and 57 is set as the value of the miss timer data 42. Alternatively, an attack invalidation period associated with a damage value of an attack of at least one of the opponent characters 56 and 57 may be set as the value of the miss timer data 42. For example, when the attack by the opponent character 56 is bare-knuckle punch, the attack invalidation period "60" associated with the damage value "0.5" calculated in the step S17 is set as the value of the miss timer data 42. In the meanwhile, when the attack is made by the opponent character 56 by using the sword 56A, the attack invalidation period "90" associated with the damage value "1.0" calculated in the step S17 is set as the value of the miss timer data 42. The damage value of the attack in this case is equivalent to the type of the damage from which a character suffers.

According to the arrangement above, it is possible to set the attack invalidation period according to the damage value of the attack on at least one of the player characters 52, 53, and 54. With this, for example, game balance is maintained in such a way that the attack invalidation period is arranged to be short when at least one of the player characters 52, 53, and 54 is hit by an attack with which the degree of reduction in the life parameter 41 is small, whereas the attack invalidation period is arranged to be long when at least one of the player characters 52, 53, and 54 is hit by an attack with which the degree of reduction in the life parameter 41 is large.

In addition to the above, while the embodiment above assumes that a game is played off line by three (a plurality of) players by using the operation controllers A to C connected to the game device 10, a game may be played on line by a plurality of players by connecting a plurality of game devices 10 over a network 30 such as the Internet.

While the embodiment above has been described with the assumption that an action game is played, it is inevitable that the technology is applicable to any kinds of games including role playing games, gun action games, and fighting games.

Furthermore, although the embodiment above assumes that a game is played by a plurality of players, the game of the present embodiment may be played by a single player. In such a case, player characters other than the player character controlled by the single player may be automatically controlled by a game program.

While the embodiment above deals with a stationary game device 10, the technology is also applicable to various apparatuses such as personal computers, smart phones, mobile phone terminals, and portable game consoles, on condition that the apparatus is provided with a display. Furthermore, at least a part of the processing executed in the game device 10 may be executed by another information processing apparatus. For example, the technology may be constituted by one or plural server executing a part of the processing and a client terminal (game device 10) communicably connected to the one or plural server over a network. Alternatively, the technology may be a distributed system constituted by a plurality of game devices 10 executing the processing in a distributed manner, and these game devices are connected with each other directly or over a network.

The detailed description above is mainly focused on characteristics of the technology for the sake of easier understanding. However, the technology is not limited to the disclosure of the detailed description above and the range of application thereof should be interpreted as broadly as possible. Further, the terms and phraseology used in the application are adopted solely to provide specific illustration of the technology, and in no case should the scope of the technology be limited by such terms and phraseology. Further, it will be obvious for those skilled in the art that other structures, systems, methods, programs, or the like are possible, within the spirit of the technology described in the application. The description of claims therefore shall encompass equivalent structures, unless otherwise such structures are regarded as to depart from the spirit and scope of the technology. To fully understand the object and effects of the technology, it is strongly encouraged to sufficiently refer to disclosures of documents already made available.

The invention claimed is:

1. A game system causing a display to display characters, comprising:
    a life parameter storage unit configured to store a life parameter related to a game end condition, the life parameter being shared by the characters;
    a life display unit configured to display a life object indicating the life parameter on the display;
    a determination unit configured to determine whether at least one of the characters is damaged based on game processing;
    a life parameter reduction unit configured to reduce the life parameter in accordance with a damage when the determination unit determines that at least one of the characters is damaged; and
    a life parameter reduction amount controller, comprising at least one computer processor, configured to control the life parameter reduction unit in such a way that, when one of the characters suffers from a first damage and then at least one of the characters suffers from a second damage within a predetermined period starting from the first damage, the life parameter reduction unit reduces the life parameter only for an amount equivalent to the first damage.

2. The game system according to claim 1, wherein, the predetermined period is set in accordance with the type of the damage from which at least one of the characters suffers.

3. The game system according to claim 1, wherein, opponent characters capable of causing the damage are displayed on the display, and
    the life parameter reduction amount controller controls the life parameter reduction unit in such a way that, when one of the characters suffers from the first damage made by one of the opponent characters and then at least one of the characters suffers from the second damage made by the one of the opponent characters within the predetermined period starting from the first damage, the life parameter reduction unit reduces the life parameter only for an amount equivalent to the first damage.

4. The game system according to claim 1, wherein, the characters are controlled by an input made by corresponding players.

5. A game control method by which characters are displayed on a display, the method comprising:
    (i) storing a life parameter shared by the characters and related to a game end condition;
    (ii) displaying a life object indicating the life parameter on the display;
    (iii) determining, using a computer processor, whether at least one of the characters is damaged based on game processing;
    (iv) reducing the life parameter in accordance with a damage when a determination is made in (iii) that at least one of the characters is damaged; and
    (v) when a determination is made that one of the characters suffers from a first damage and then at least one of the characters suffers from a second damage within a predetermined period starting from the first damage, reducing the life parameter only for an amount equivalent to the first damage in (iv).

6. The game control method according to claim 5, wherein, the predetermined period is set in accordance with the type of the damage from which at least one of the characters suffers.

7. The game control method according to claim 5, wherein, opponent characters capable of causing the damage are displayed on the display, and
    in (v), when the determination is made that one of the characters suffers from the first damage made by one of the opponent characters and then at least one of the characters suffers from the second damage made by the one of the opponent characters within the predetermined period starting from the first damage, in (iv) the life parameter is reduced only for an amount equivalent to the first damage.

8. The game control method according to claim 5, wherein, the characters are controlled by an input made by corresponding players.

9. A game device causing a display to display characters, comprising:
    a life parameter storage unit configured to store a life parameter related to a game end condition, the life parameter being shared by the characters;
    a life display unit configured to display a life object indicating the life parameter on the display;
    a determination unit configured to determine whether at least one of the characters is damaged based on game processing;
    a life parameter reduction unit configured to reduce the life parameter in accordance with a damage when the determination unit determines that at least one of the characters is damaged; and
    a life parameter reduction amount controller, comprising at least one computer processor, configured to control the life parameter reduction unit in such a way that, when one of the characters suffers from a first damage and then at least one of the characters suffers from a second damage within a predetermined period starting from the first damage, the life parameter reduction unit reduces the life parameter only for an amount equivalent to the first damage.

10. A computer-readable non-transitory storage medium storing a game program executed by a computer of a game system causing a display to display characters, the game program causing the computer to provide functionality comprising
    storage of a life parameter related to a game end condition, the life parameter being shared by the characters;
    display of a life object indicating the life parameter on the display;
    determination of whether at least one of the characters is damaged based on game processing;
    reduction of the life parameter in accordance with a damage when a determination is made that at least one of the characters is damaged; and
    control of the life parameter reduction in such a way that, when one of the characters suffers from a first damage and then at least one of the characters suffers from a second damage within a predetermined period starting from the first damage, the life parameter is reduced only for an amount equivalent to the first damage.

* * * * *